United States Patent
Hashizume

(10) Patent No.: US 12,358,233 B2
(45) Date of Patent: Jul. 15, 2025

(54) THREE-DIMENSIONAL SHAPING DEVICE

(71) Applicant: SEIKO EPSON CORPORATION, Tokyo (JP)

(72) Inventor: Keitaro Hashizume, Shiojiri (JP)

(73) Assignee: SEIKO EPSON CORPORATION (JP)

(*) Notice: Subject to any disclaimer, the term of this patent is extended or adjusted under 35 U.S.C. 154(b) by 0 days.

(21) Appl. No.: 18/088,827

(22) Filed: Dec. 27, 2022

(65) Prior Publication Data
US 2023/0202117 A1    Jun. 29, 2023

(30) Foreign Application Priority Data
Dec. 28, 2021  (JP) ................. 2021-213937

(51) Int. Cl.
| | |
|---|---|
| B29C 64/393 | (2017.01) |
| B29C 64/245 | (2017.01) |
| B29C 64/295 | (2017.01) |
| B29C 64/35 | (2017.01) |
| B33Y 30/00 | (2015.01) |
| B33Y 50/02 | (2015.01) |

(52) U.S. Cl.
CPC .......... *B29C 64/393* (2017.08); *B29C 64/245* (2017.08); *B29C 64/295* (2017.08); *B29C 64/35* (2017.08); *B33Y 30/00* (2014.12); *B33Y 50/02* (2014.12)

(58) Field of Classification Search
None
See application file for complete search history.

(56) References Cited

U.S. PATENT DOCUMENTS

| | | | |
|---|---|---|---|
| 2015/0251358 A1 | 9/2015 | Ho et al. | |
| 2019/0315066 A1 | 10/2019 | Maeda | |
| 2020/0122407 A1* | 4/2020 | Yamazaki | ............... B22F 10/30 |
| 2022/0227054 A1* | 7/2022 | Heufelder | ............. B29C 64/165 |

FOREIGN PATENT DOCUMENTS

| | | |
|---|---|---|
| JP | 2018-089859 A | 6/2018 |
| JP | 2019-034457 A | 3/2019 |

* cited by examiner

*Primary Examiner* — Farah Taufiq
(74) *Attorney, Agent, or Firm* — Harness, Dickey & Pierce, P.L.C.

(57) ABSTRACT

A three-dimensional shaping device includes: a stage, a heater, a head, a movement mechanism, and a control unit. The control unit is configured to perform first shaping layer forming processing of forming a first shaping layer by controlling the head and the movement mechanism to dispense the shaping material from the head, dispensing stop processing of stopping dispensing of the shaping material from the head by controlling the head, determination processing of determining whether a predetermined time is elapsed since the dispensing stop processing is performed, and second shaping layer forming processing of forming a second shaping layer on the first shaping layer by controlling the head and the movement mechanism to dispense the shaping material from the head when it is determined in the determination processing that the predetermined time is elapsed. The control unit is configured to set the predetermined time based on information related to a shaping time of the first shaping layer.

3 Claims, 9 Drawing Sheets

THREE-DIMENSIONAL SHAPING DEVICE

The present application is based on, and claims priority from JP Application Serial Number 2021-213937, filed Dec. 28, 2021, the disclosure of which is hereby incorporated by reference herein in its entirety.

BACKGROUND

1. Technical Field

The present disclosure relates to a three-dimensional shaping device.

2. Related Art

There is known a three-dimensional shaping device that shapes a three-dimensional shaped object by dispensing a melted material from a nozzle to deposit and cure the material. The three-dimensional shaped object is shaped as a laminated body in which a plurality of shaping layers are laminated.

For example, JP-A-2019-34457 describes a three-dimensional shaping device that promotes curing of a melted material dispensed from a nozzle by dispensing the melted material from the nozzle while cooling the melted material by a cooling unit.

However, in the three-dimensional shaping device described in JP-A-2019-34457, since the cooling unit is provided in the vicinity of the nozzle, only a shaping layer in the vicinity of the nozzle is cooled. Therefore, when a currently formed layer is n layer and a layer formed immediately before the n layer is n−1 layer, it may be difficult to sufficiently lower a temperature of the entire n−1 layer depending on a size of the n−1 layer. When the melted material is dispensed onto the n−1 layer before the entire n−1 layer is cured, the shape of the n−1 layer collapses.

SUMMARY

One aspect of a three-dimensional shaping device according to the present disclosure includes:
a stage;
a heater covering a shaping region of the stage and facing the stage;
a head configured to dispense a shaping material toward the shaping region;
a movement mechanism configured to move the stage and the head relative to each other; and
a control unit configured to control the head and the movement mechanism, in which
the control unit is configured to perform
first shaping layer forming processing of forming a first shaping layer by controlling the head and the movement mechanism to dispense the shaping material from the head,
dispensing stop processing of stopping dispensing of the shaping material from the head by controlling the head,
determination processing of determining whether a predetermined time is elapsed since the dispensing stop processing is performed, and
second shaping layer forming processing of forming a second shaping layer on the first shaping layer by controlling the head and the movement mechanism to dispense the shaping material from the head when it is determined in the determination processing that the predetermined time is elapsed, and
the control unit is configured to set the predetermined time based on information related to a shaping time of the first shaping layer.

DESCRIPTION OF EXEMPLARY EMBODIMENTS

Hereinafter, preferred embodiments of the present disclosure will be described in detail with reference to the drawings. The embodiments to be described below do not unduly limit contents of the present disclosure described in the claims. In addition, not all configurations to be described below are necessarily essential components of the present disclosure.

1. Three-Dimensional Shaping Device
1.1. Overall Configuration

Figure 1:
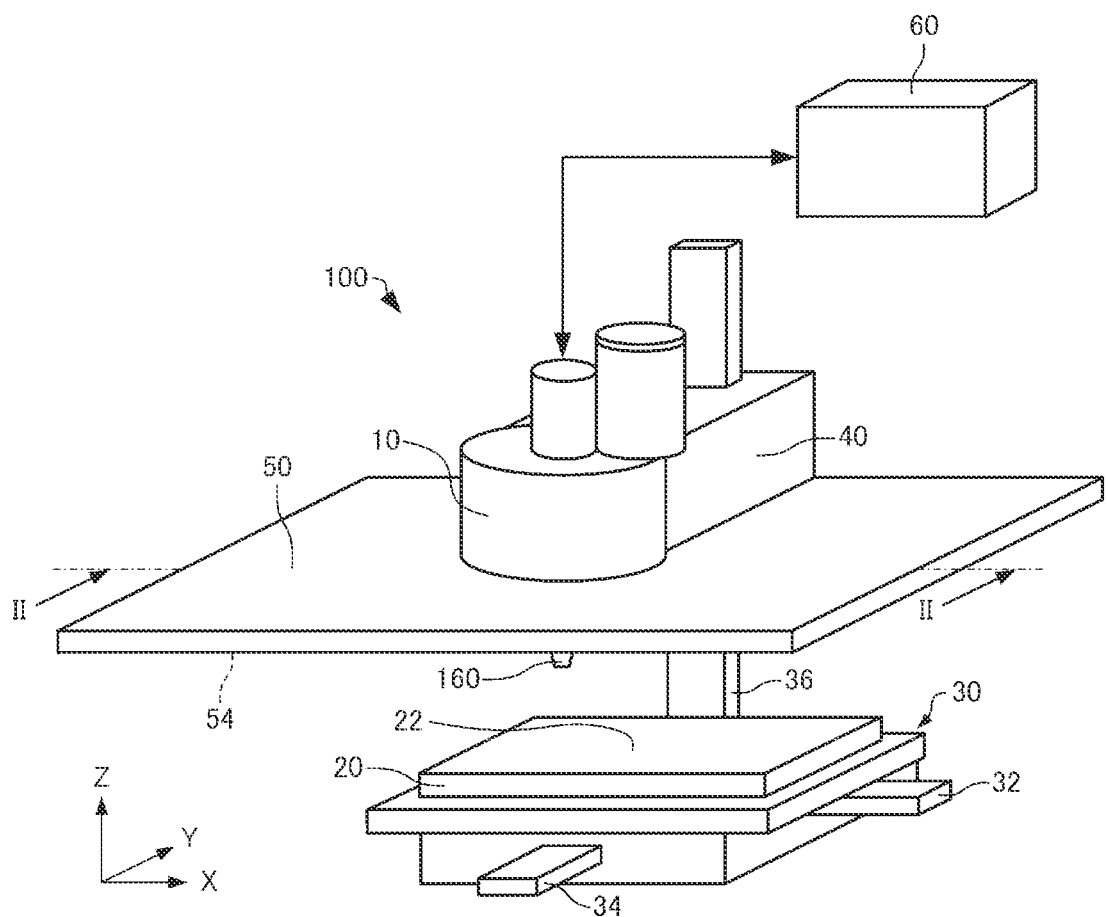
FIG. 1 is a side view schematically showing a three-dimensional shaping device according to an embodiment.
Figure 2:
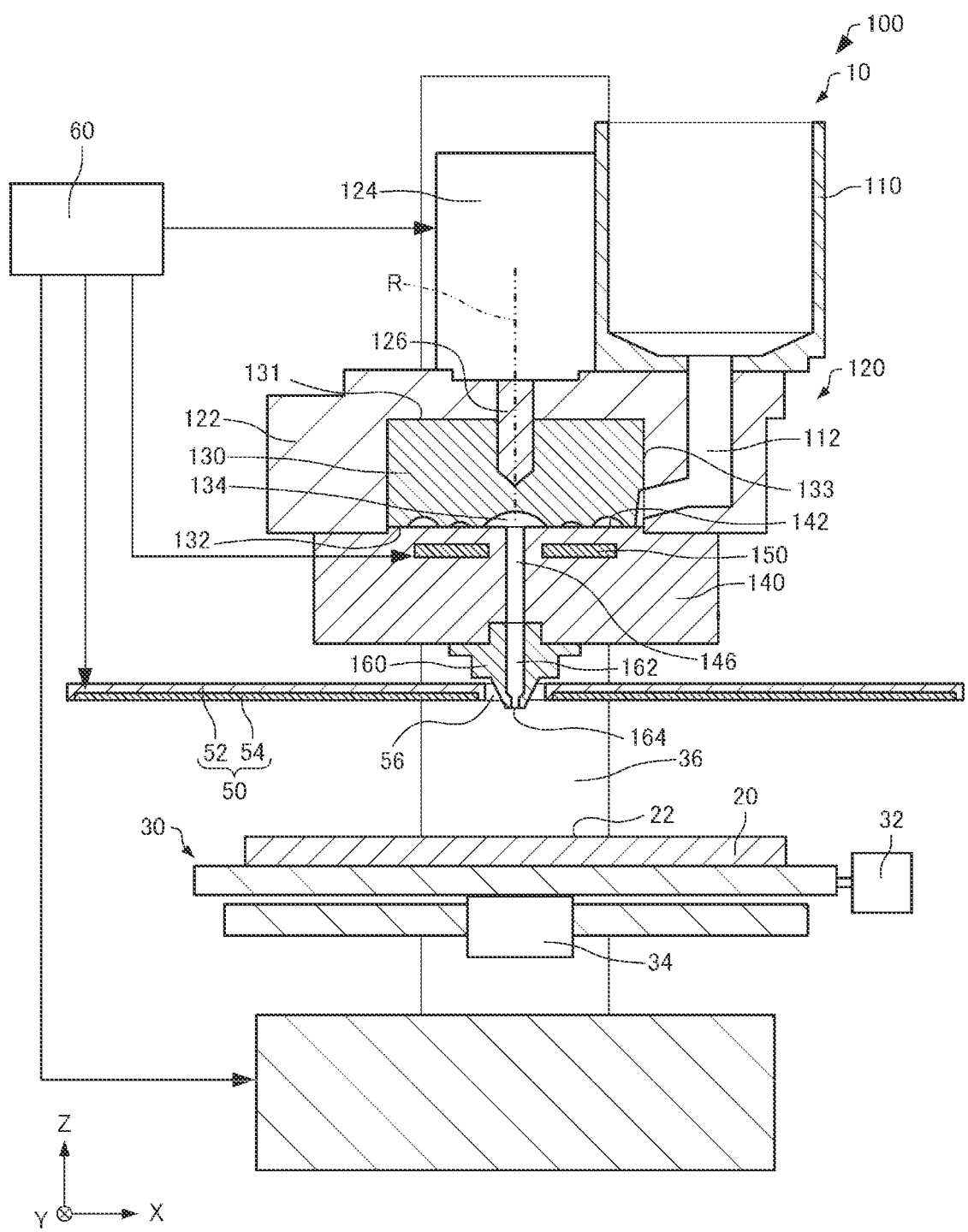
FIG. 2 is a cross-sectional view schematically showing the three-dimensional shaping device according to the present embodiment.

First, a three-dimensional shaping device according to the present embodiment will be described with reference to the drawings. FIG. 1 is a perspective view schematically showing a three-dimensional shaping device 100 according to the present embodiment. FIG. 2 is a cross-sectional view taken along a line II-II of FIG. 1 schematically showing the three-dimensional shaping device 100 according to the present embodiment. In FIGS. 1 and 2, an X-axis, a Y-axis, and a Z-axis are shown as three axes orthogonal to each other. The X-axis direction and the Y-axis direction are, for example, horizontal directions. The Z-axis direction is, for example, a vertical direction.

As shown in FIGS. 1 and 2, the three-dimensional shaping device 100 includes, for example, a head 10, a stage 20, a movement mechanism 30, a support member 40, a heating mechanism 50, and a control unit 60.

The three-dimensional shaping device 100 drives the movement mechanism 30 to change a relative position between the head 10 and the stage 20 while dispensing a plasticized shaping material from the head 10 toward the stage 20. Accordingly, the three-dimensional shaping device 100 shapes a three-dimensional shaped object having a desired shape on the stage 20.

For example, as shown in FIG. 2, the head 10 includes a material supply unit 110, a plasticizing unit 120, and a nozzle 160. The head 10 dispenses the shaping material toward a shaping region 22 of the stage 20.

A material in a form of pellets or powder is charged into the material supply unit 110. The material supply unit 110 supplies, to the plasticizing unit 120, the material serving as a raw material. The material supply unit 110 is implemented by, for example, a hopper. The material supplied by the material supply unit 110 is, for example, an acrylonitrile butadiene styrene (ABS) resin.

The material supply unit 110 and the plasticizing unit 120 are coupled by a supply path 112 provided below the material supply unit 110. The material supplied to the material supply unit 110 is supplied to the plasticizing unit 120 via the supply path 112.

As shown in FIG. 2, the plasticizing unit 120 includes, for example, a screw case 122, a drive motor 124, a flat screw 130, a barrel 140, and a heater 150. The plasticizing unit 120 plasticizes the material in a solid state supplied from the material supply unit 110, generates a paste-like shaping material having fluidity, and supplies the paste-like shaping material to the nozzle 160.

The term "plasticize" is a concept including melting, and means changing from a solid state to a state having fluidity. Specifically, for a material in which glass transition occurs, the "plasticize" refers to setting a temperature of the material to be equal to or higher than a glass transition point. For a material in which glass transition does not occur, the "plasticize" refers to setting the temperature of the material to a temperature equal to or higher than a melting point.

The screw case 122 is a housing that houses the flat screw 130. The barrel 140 is provided on a lower surface of the screw case 122. The flat screw 130 is housed in a space surrounded by the screw case 122 and the barrel 140.

The drive motor 124 is provided on an upper surface of the screw case 122. The drive motor 124 is, for example, a servomotor. A shaft 126 of the drive motor 124 is coupled to an upper surface 131 of the flat screw 130. The drive motor 124 is controlled by the control unit 60. Although not shown, the shaft 126 of the drive motor 124 and the upper surface 131 of the flat screw 130 may be coupled to each other via a speed reducer.

The flat screw 130 has a substantially cylindrical shape in which a size in a direction of a rotation axis R is smaller than a size in a direction orthogonal to the direction of the rotation axis R. In the illustrated example, the rotation axis R is parallel to the Z-axis. The flat screw 130 is rotated about the rotation axis R by a torque generated by the drive motor 124.

Figure 3:
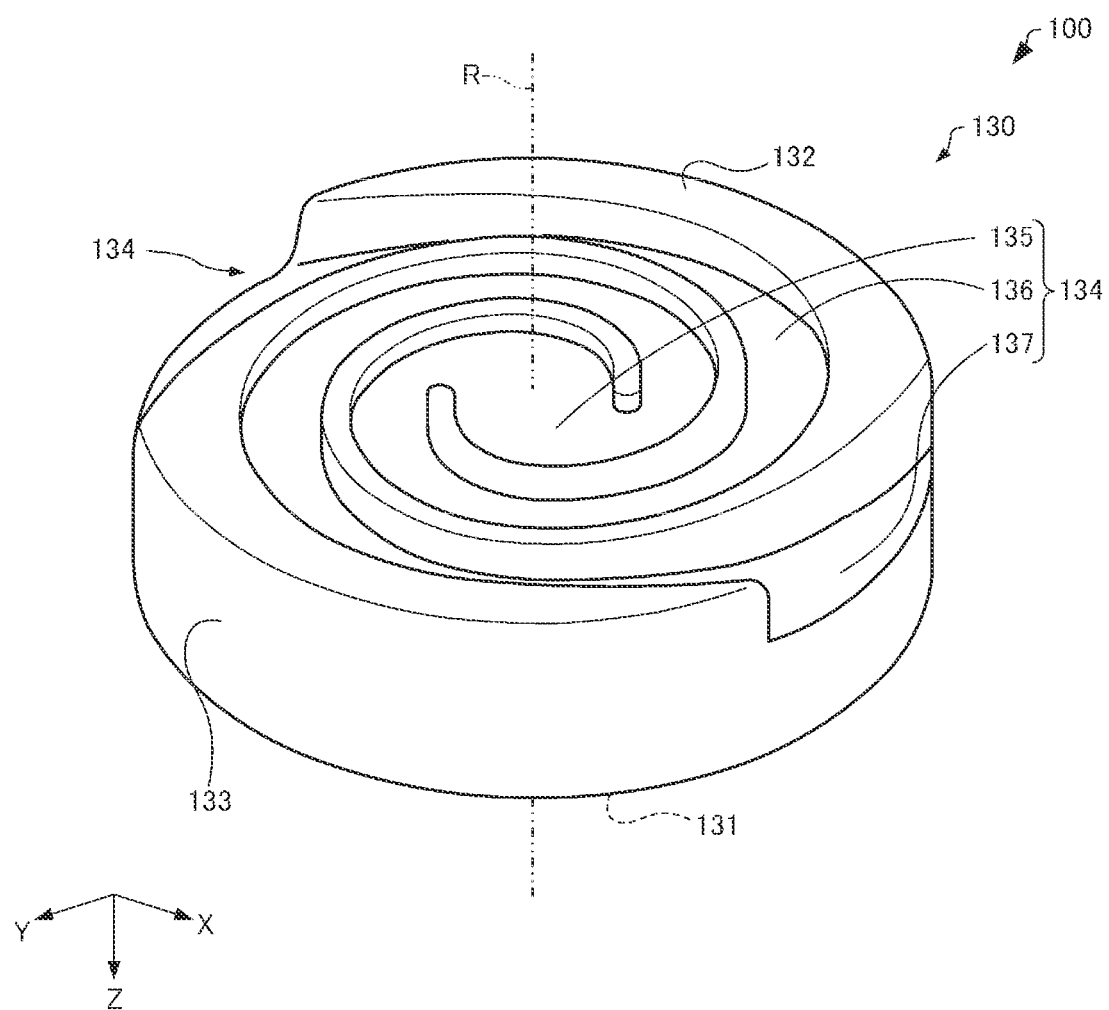
FIG. 3 is a perspective view schematically showing a flat screw of the three-dimensional shaping device according to the present embodiment.

The flat screw 130 has the upper surface 131, a groove forming surface 132 opposite to the upper surface 131, and a side surface 133 coupling the upper surface 131 and the groove forming surface 132. A first groove 134 is formed in the groove forming surface 132. The side surface 133 is, for example, perpendicular to the groove forming surface 132. Here, FIG. 3 is a perspective view schematically showing the flat screw 130. For convenience, FIG. 3 shows a state in which an up-down positional relationship is reversed from a state shown in FIG. 2.

As shown in FIG. 3, the first groove 134 is formed in the groove forming surface 132 of the flat screw 130. The first groove 134 includes, for example, a central portion 135, a coupling portion 136, and a material introduction portion 137. The central portion 135 faces a communication hole 146 formed in the barrel 140. The central portion 135 communicates with the communication hole 146. The coupling portion 136 couples the central portion 135 and the material introduction portion 137. In the illustrated example, the coupling portion 136 is provided in a spiral shape from the central portion 135 toward an outer periphery of the groove forming surface 132. The material introduction portion 137 is provided on the outer periphery of the groove forming surface 132. That is, the material introduction portion 137 is provided on the side surface 133 of the flat screw 130. The material supplied from the material supply unit 110 is introduced from the material introduction portion 137 into the first groove 134, passes through the coupling portion 136 and the central portion 135, and is conveyed to the communication hole 146 formed in the barrel 140. For example, two first grooves 134 are provided.

The number of the first grooves 134 is not particularly limited. Although not shown, three or more first grooves 134 may be provided, or only one first groove 134 may be provided. In addition, although not shown, the three-dimensional shaping device 100 may include an in-line screw instead of the flat screw 130.

As shown in FIG. 2, the barrel 140 is provided below the flat screw 130. The barrel 140 has a facing surface 142 facing the groove forming surface 132 of the flat screw 130. The communication hole 146 communicating with the first groove 134 is formed in the center of the facing surface 142. Here, FIG. 4 is a plan view schematically showing the barrel 140.

Figure 4:
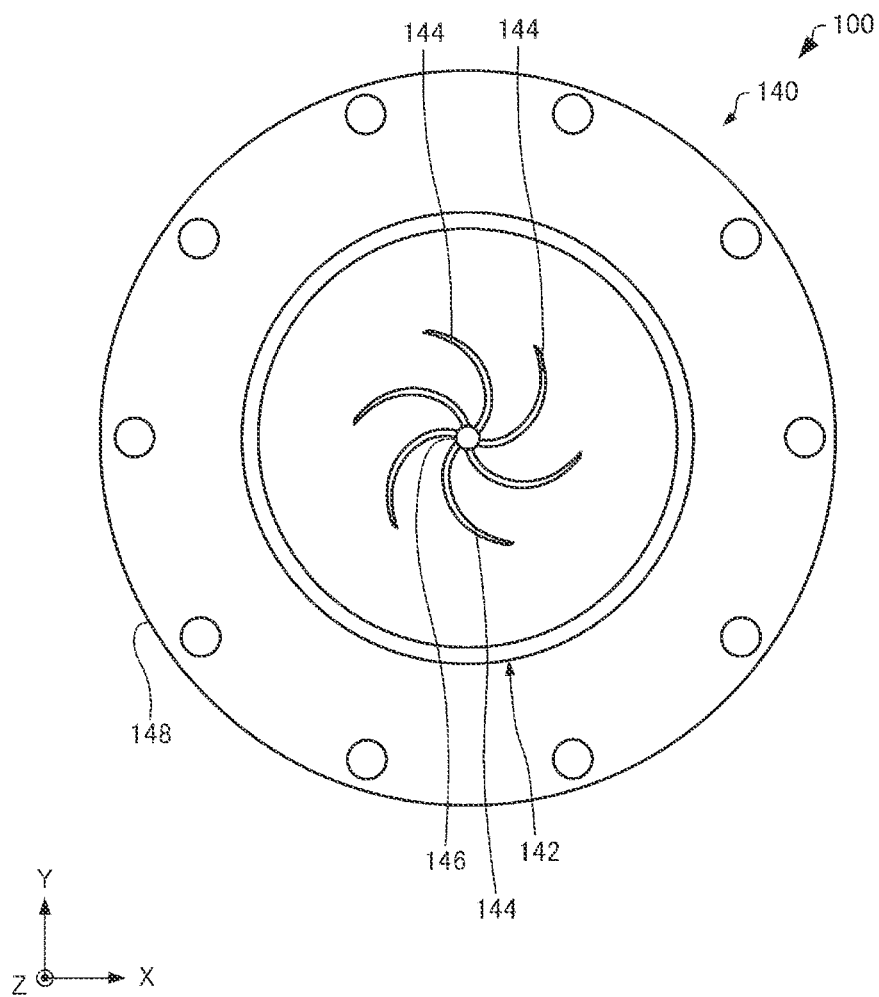
FIG. 4 is a plan view schematically showing a barrel of the three-dimensional shaping device according to the present embodiment.

As shown in FIG. 4, a second groove 144 and the communication hole 146 are formed in the facing surface 142 of the barrel 140. A plurality of the second grooves 144 are formed. In the illustrated example, six second grooves 144 are formed, and the number of second grooves 144 is not particularly limited. The plurality of second grooves 144 are formed around the communication hole 146 when viewed from the Z-axis direction. One end of the second groove 144 is coupled to the communication hole 146, and the second grooves 144 extend spirally from the communication hole 146 toward an outer periphery 148 of the barrel 140. The second grooves 144 have a function of guiding the plasticized material to the communication hole 146.

A shape of the second groove 144 is not particularly limited, and may be, for example, a linear shape. In addition, one end of the second groove 144 may not be coupled to the communication hole 146. Further, the second groove 144 may not be formed in the facing surface 142. However, in consideration of efficiently guiding the plasticized material to the communication hole 146, the second groove 144 is preferably formed in the facing surface 142.

As shown in FIG. 2, the heater 150 is provided in the barrel 140. The heater 150 heats the material supplied between the flat screw 130 and the barrel 140. The output of the heater 150 is controlled by the control unit 60. The plasticizing unit 120 generates the plasticized shaping material by heating the shaping material while conveying the shaping material toward the communication hole 146 by using the flat screw 130, the barrel 140, and the heater 150, and causes the generated shaping material to flow out from the communication hole 146. Although not shown, a shape of the heater 150 may be a ring shape when viewed from the Z-axis direction.

The nozzle 160 is provided below the barrel 140. The nozzle 160 dispenses the material supplied from the plasticizing unit 120 toward the stage 20. A nozzle flow path 162 is formed in the nozzle 160. The nozzle flow path 162 communicates with the communication hole 146. The nozzle flow path 162 has a nozzle opening 164. The nozzle opening 164 is positioned at a front end of the nozzle 160. The material supplied from the communication hole 146 passes through the nozzle flow path 162 and is dispensed from the nozzle opening 164.

As shown in FIGS. 1 and 2, the stage 20 is provided below the nozzle 160. In the illustrated example, a shape of the stage 20 is a rectangular parallelepiped. The stage 20 has the shaping region 22. The shaping material is dispensed from the head 10 to the shaping region 22. The shaping region 22 is a region on an upper surface of the stage 20. The shaping region 22 is defined by a position of the nozzle opening 164 of the head 10. For example, when the stage 20 is moved in the X-axis direction and the Y-axis direction by the movement mechanism 30, an end of the shaping region 22 in the −X-axis direction is positioned below the nozzle opening 164 when the stage 20 is moved most in the +X-axis direction. An end of the shaping region 22 in the +X-axis direction is positioned below the nozzle opening 164 when the stage 20 is moved most in the −X-axis direction.

The movement mechanism 30 supports the stage 20. The movement mechanism 30 moves the stage 20 and the head 10 relative to each other. Further, the movement mechanism 30 moves the stage 20 and the heating mechanism 50 relative to each other. The heating mechanism 50 is moved, for example, in accordance with the movement of the head 10. In the illustrated example, the movement mechanism 30 moves the stage 20 in the X-axis direction and the Y-axis direction to change the relative positions between the stage 20 and the head 10, the heating mechanism 50 in the X-axis direction and the Y-axis direction. Further, the movement mechanism 30 moves the head 10 and the heating mechanism 50 in the Z-axis direction to change the relative positions between the stage 20 and the head 10, the heating mechanism 50 in the Z-axis direction.

The movement mechanism 30 includes, for example, a first electric actuator 32, a second electric actuator 34, and a third electric actuator 36. The first electric actuator 32 moves the stage 20 in the X-axis direction. The second electric actuator 34 moves the stage 20 in the Y-axis direction. The third electric actuator 36 moves the head 10 and the heating mechanism 50 in the Z-axis direction.

The support member 40 is coupled to the third electric actuator 36. In the illustrated example, the support member 40 extends in the −Y-axis direction from the third electric actuator 36. The support member 40 supports the head 10 and the heating mechanism 50. The movement mechanism 30 moves the head 10 and the heating mechanism 50 in the Z-axis direction by moving the support member 40 in the Z-axis direction using the third electric actuator 36.

A shape of the heating mechanism 50 is, for example, a substantially plate shape. The heating mechanism 50 includes, for example, a support plate 52 and a heater 54. The heater 54 is supported by the support plate 52. The heater 54 covers the shaping region 22 of the stage 20. The heater 54 faces the stage 20. When viewed from the Z-axis direction, the stage 20 is provided, for example, on an inner side of an outer edge of the heater 54. The heater 54 heats a shaping layer made of the shaping material deposited in the shaping region 22. The heater 54 can heat the entire shaping region 22. The output of the heater 54 is controlled by the control unit 60.

As shown in FIG. 2, a through hole 56 is formed in the heating mechanism 50. In the illustrated example, the through hole 56 penetrates the heating mechanism 50 in the Z-axis direction. The nozzle 160 is positioned in the through hole 56. In the illustrated example, the flat screw 130 and the barrel 140 are positioned in the +Z-axis direction of the heating mechanism 50, and the nozzle opening 164 and the stage 20 are positioned in the −Z-axis direction of the heating mechanism 50.

The shape of the heating mechanism 50 is not particularly limited as long as the heater 54 can heat the shaping region 22. For example, the three-dimensional shaping device 100 may include a chamber (not shown) that houses the head 10, the stage 20, and the movement mechanism 30, and the heating mechanism 50 may heat the shaping region 22 by heating the entire chamber.

For example, the control unit 60 is implemented by a computer including a processor, a main storage device, and an input and output interface that receives and outputs a signal from and to the outside. The control unit 60 exerts various functions, for example, by the processor executing a program read into the main storage device. Specifically, the control unit 60 controls the head 10, the movement mechanism 30, and the heating mechanism 50. The control unit 60 may be implemented by a combination of a plurality of circuits instead of the computer.

1.2. Processing of Control Unit

Figure 5:
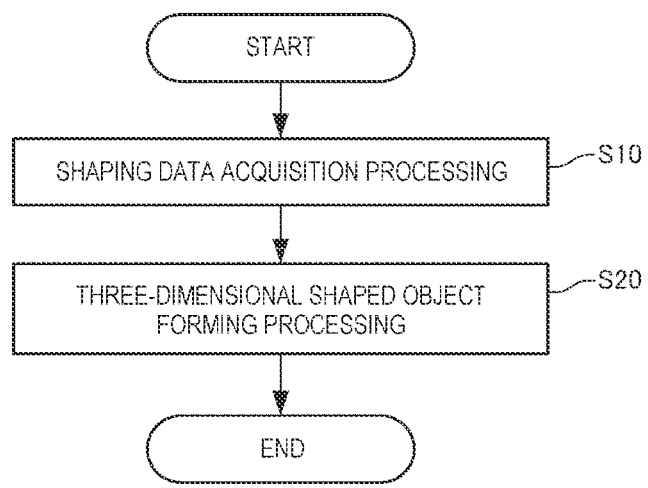
FIG. 5 is a flowchart showing processing of a control unit of the three-dimensional shaping device according to the present embodiment.

FIG. 5 is a flowchart showing processing of the control unit 60. For example, the user operates an operation unit (not shown) to output, to the control unit 60, a processing start signal for starting the processing. The operation unit includes, for example, a mouse, a keyboard, and a touch panel. When the processing start signal is received, the control unit 60 starts the processing. Hereinafter, each processing will be described.

1.2.1. Shaping Data Acquisition Processing

First, as shown in FIG. 5, the control unit 60 performs shaping data acquisition processing of acquiring shaping data for shaping a three-dimensional shaped object (step S10).

The shaping data is created by, for example, causing a slicer software, which is installed in a computer coupled to the three-dimensional shaping device 100, to read shape data. The shape data is data representing a target shape of the three-dimensional shaped object created using three-dimensional computer aided design (CAD) software, three-dimensional computer graphics (CG) software, and the like. As the shape data, for example, data in a standard triangulated language (STL) format, an additive manufacturing file format (AMF), and the like is used. The slicer software divides the target shape of the three-dimensional shaped object into layers each having a predetermined thickness, and creates shaping data for each layer. The shaping data is represented by a G code or the like.

The shaping data includes, for example, information on a movement path of the nozzle 160 with respect to the stage 20, an amount of the shaping material dispensed from the nozzle 160, an area of each of the plurality of shaping layers forming the three-dimensional shaped object, cleaning of the nozzle 160, and the like. The "area of the shaping layer" refers to the area of the shaping layer when viewed from the Z-axis direction, which is a dispensing direction of the shaping material. The control unit 60 acquires the shaping data from the computer coupled to the three-dimensional shaping device 100 or a recording medium such as a universal serial bus (USB) memory.

1.2.2. Three-Dimensional Shaped Object Forming Processing

Next, the control unit 60 performs three-dimensional shaped object forming processing of forming the three-dimensional shaped object on the stage 20 (step S20).

Specifically, the control unit 60 plasticizes the material supplied between the flat screw 130 and the barrel 140 to generate the shaping material, and dispenses the shaping material from the nozzle 160. For example, the control unit 60 continues to generate the shaping material until the three-dimensional shaped object forming processing is completed. Further, the control unit 60 drives the heater 54. For example, the control unit 60 continues to drive the heater 54 until the three-dimensional shaped object forming processing is completed. Here, FIG. 6 is a cross-sectional view showing the three-dimensional shaped object forming processing.

Figure 6:
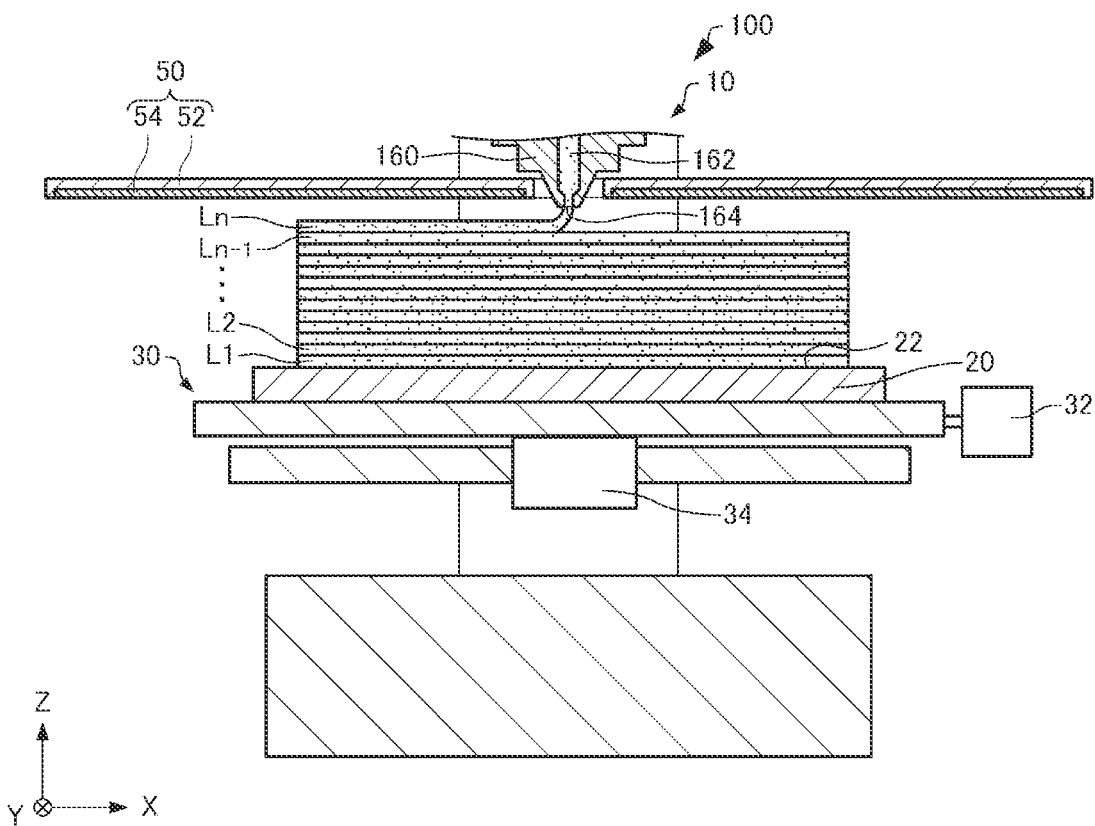
FIG. 6 is a cross-sectional view showing three-dimensional shaped object forming processing of the three-dimensional shaping device according to the present embodiment.

As shown in FIG. 6, the control unit 60 controls the head 10 to dispense the shaping material from the nozzle 160 toward the stage 20 while controlling the movement mechanism 30 to change the relative position between the nozzle 160 and the stage 20 based on the acquired shaping data.

Specifically, before the three-dimensional shaped object forming processing is started, that is, before formation of a shaping layer L1 which is a first shaping layer is started, the nozzle 160 is disposed at an initial position in the −X-axis direction with respect to an end portion of the stage 20 in the −X-axis direction. When the three-dimensional shaped object forming processing is started, as shown in FIG. 6, the control unit 60 controls the movement mechanism 30 to move, for example, the nozzle 160 in the +X-axis direction relative to the stage 20. When the nozzle 160 passes over the stage 20, the shaping material is dispensed from the nozzle 160. Accordingly, the shaping layer L1 is formed. In FIG. 6, n is any natural number, and the shaping layers up to the n-th shaping layer Ln are shown.

Figure 7:
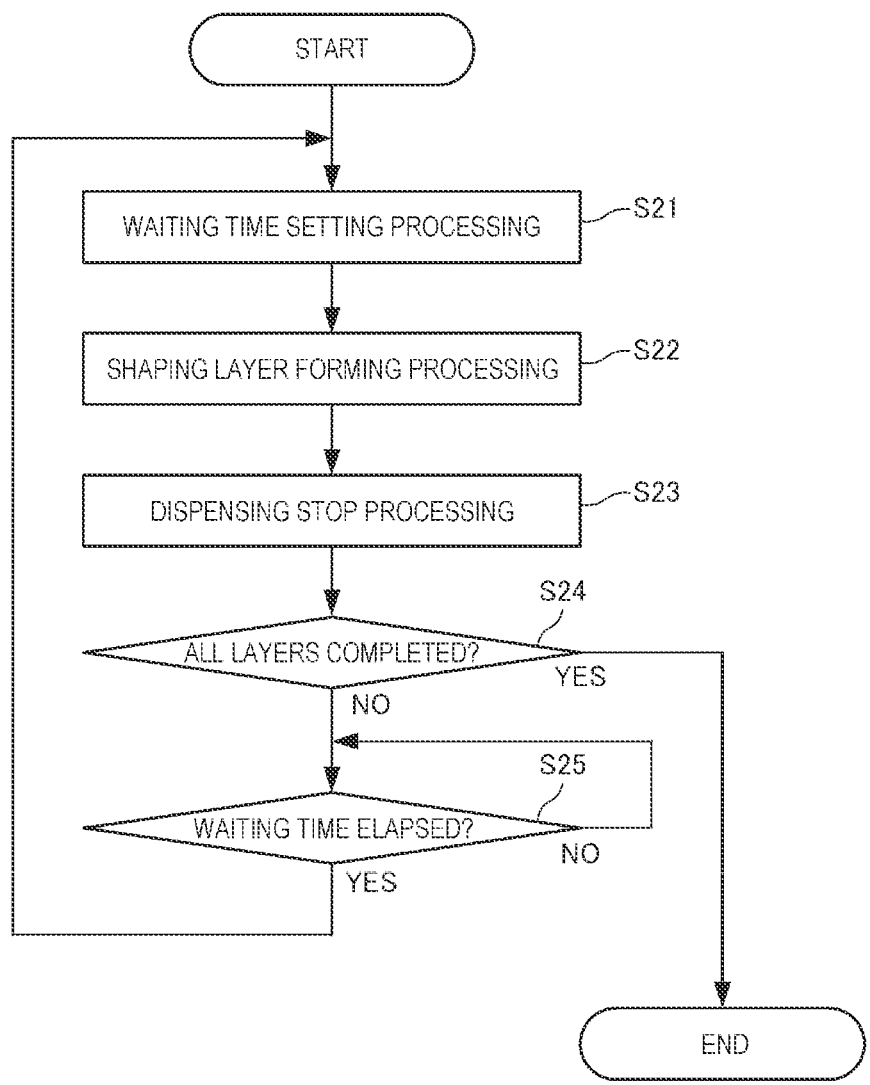
FIG. 7 is a flowchart showing processing of the control unit of the three-dimensional shaping device according to the present embodiment.

Here, FIG. 7 is a flowchart showing the three-dimensional shaped object forming processing of the control unit 60 in more detail.

When the shaping data acquisition processing described above is completed, the control unit 60 performs waiting time setting processing of setting a waiting time based on information on a shaping time of a (n−1)th shaping layer Ln−1 as shown in FIG. 7 (step S21).

Here, the "waiting time" is a time during which the head 10 is caused to wait in a state in which the dispensing of the shaping material from the head 10 is stopped in step S25 described later after the shaping layer Ln−1 is formed. As the shaping time of the shaping layer Ln−1 is shorter, an n-th shaping layer Ln is formed immediately after the shaping layer Ln−1 is formed, and thus the n-th shaping layer Ln may be formed before the shaping layer Ln−1 is cured. Therefore, the shorter the shaping time of the shaping layer Ln−1 is, the longer the control unit 60 sets the waiting time.

The information on the shaping time of the shaping layer Ln−1 is included in the shaping data. The control unit 60 may calculate and set the waiting time based on information on an area of the shaping layer Ln−1 included in the shaping data, or may acquire and set the waiting time based on the shaping data when the shaping data directly includes the waiting time.

Next, the control unit 60 controls the head 10 and the movement mechanism 30 based on the shaping data to perform shaping layer forming processing of dispensing the shaping material from the head 10 to form the shaping layer Ln−1 on the stage 20 (step S22).

Next, the control unit 60 controls the head 10 to perform dispensing stop processing of stopping the dispensing of the shaping material from the head 10 (step S23). Specifically, the control unit 60 stops the dispensing of the shaping material from the head 10 by controlling a butterfly valve (not shown) provided in the head 10.

Next, the control unit 60 performs determination processing of determining whether the formation of all the shaping layers is completed based on the shaping data (step S24).

When it is determined that the formation of all the shaping layers is not completed ("NO" in step S24), the control unit 60 performs determination processing of determining whether a predetermined time is elapsed since the dispensing stop processing is performed (step S25). The "predetermined time" is the waiting time set in step S21 described above.

When it is determined that the waiting time is not elapsed since the dispensing stop processing is performed ("NO" in step S25), the control unit 60 repeats step S25 until it is determined that the waiting time is elapsed since the dispensing stop processing is performed. On the other hand, when it is determined that the waiting time is elapsed since the dispensing stop processing is performed ("YES" in step S25), the control unit 60 returns the processing to step S21.

When it is determined that the formation of all the shaping layers is completed ("YES" in step S24), the control unit 60 ends the processing.

1.3. Function and Effect

In the three-dimensional shaping device 100, the control unit 60 performs first shaping layer forming processing of forming the shaping layer Ln−1 as a first shaping layer by controlling the head 10 and the movement mechanism 30 to dispense the shaping material from the head 10, dispensing stop processing of stopping the dispensing of the shaping material from the head 10 by controlling the head 10, determination processing of determining whether the waiting time is elapsed since the dispensing stop processing is performed, and second shaping layer forming processing of forming the shaping layer Ln as a second shaping layer on the shaping layer Ln−1 by controlling the head 10 and the movement mechanism 30 to dispense the shaping material from the head 10 when it is determined in the determination processing that the waiting time is elapsed. The control unit 60 sets the waiting time based on the information on the shaping time of the shaping layer Ln−1.

Therefore, in the three-dimensional shaping device 100, the temperature of the entire shaping layer Ln−1 can be lowered before the shaping layer Ln is formed. Accordingly, the entire shaping layer Ln−1 can be cured. Therefore, it is possible to reduce the possibility that the shape of the shaping layer Ln−1 collapses when the shaping layer Ln is formed.

Further, in the three-dimensional shaping device 100, the shaping layer Ln−1 can be cooled more uniformly as compared with a case when the shaping layer Ln−1 is locally cooled by a cooling unit such as a blowing unit. When the shaping layer Ln−1 is locally cooled by the cooling unit, a stress due to thermal contraction of the shaping layer Ln−1 becomes non-uniform. In the three-dimensional shaping device 100, since the shaping layer Ln−1 is cooled without using a cooling unit such as a blowing unit, the shaping layer Ln−1 can be gradually cooled, and the uniformity of the stress generated in the shaping layer Ln−1 can be increased.

2. Modification

2.1. First Modification

Figure 8:
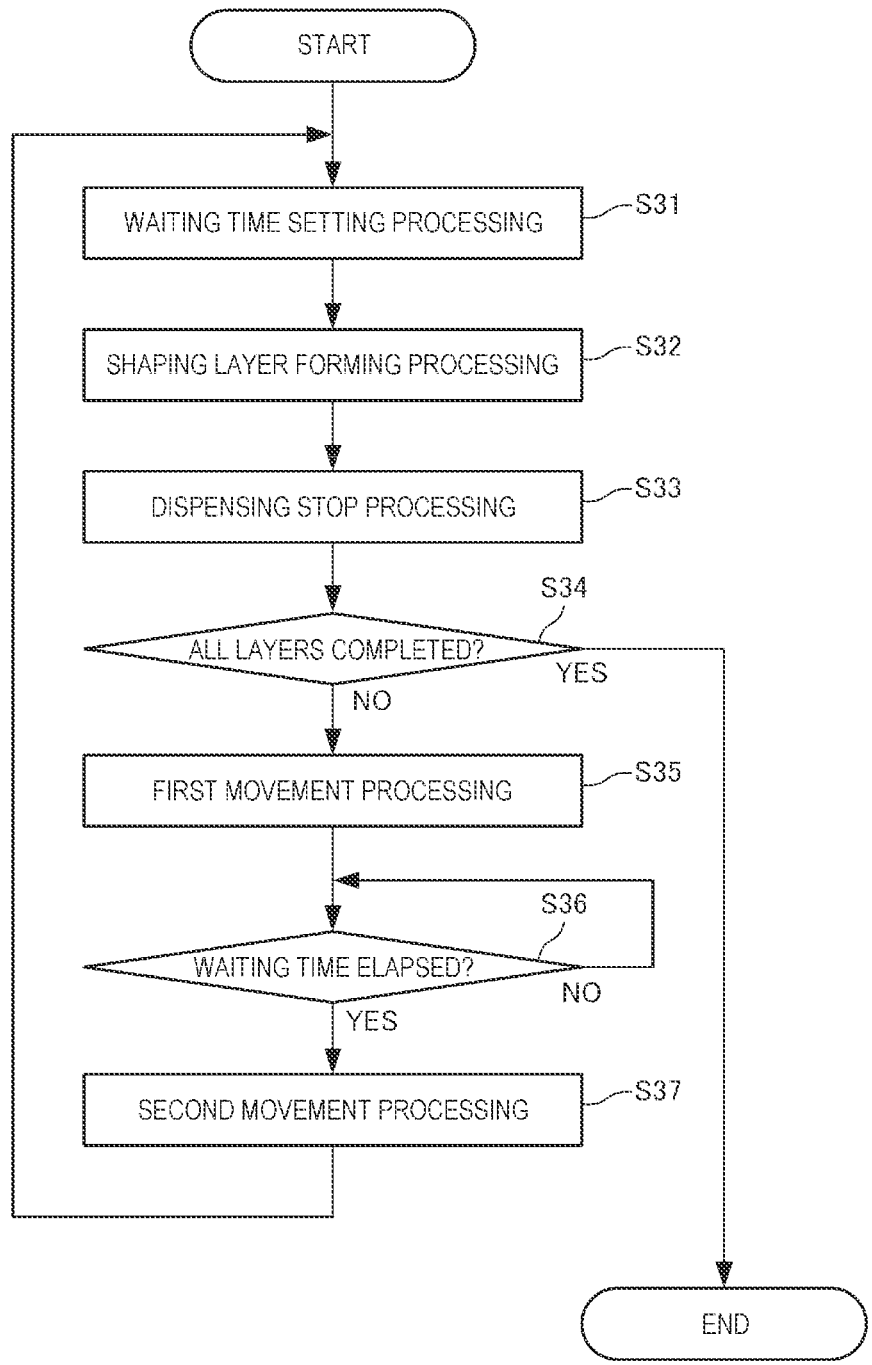
FIG. 8 is a flowchart showing processing of a control unit of a three-dimensional shaping device according to a first modification of the present embodiment.

Next, a three-dimensional shaping device according to a first modification of the present embodiment will be described with reference to the drawings. FIG. 8 is a flowchart showing the three-dimensional shaped object forming processing of the control unit 60 of the three-dimensional shaping device according to the first modification of the present embodiment.

Hereinafter, in the three-dimensional shaping device according to the first modification of the present embodiment, points different from the example of the three-dimensional shaping device 100 according to the present embodiment described above will be described, and description of the same points will be omitted. This is the same in a three-dimensional shaping device according to second and third modifications of the present embodiment described later.

As shown in FIG. 8, the three-dimensional shaping device according to the first modification of the present embodiment is different from the three-dimensional shaping device 100 described above in that first movement processing (step S35) and second movement processing (step S37) are performed.

As shown in FIG. 8, after performing waiting time setting processing (step S31), shaping layer forming processing (step S32), dispensing stop processing (step S33), and determination processing (step S34), the control unit 60 controls the movement mechanism 30 to perform the first movement processing of moving the stage 20 and the heater 54 relative to each other to increase a distance between the stage 20 and the heater 54 (step S35). Specifically, the control unit 60 controls the movement mechanism 30 to move the head 10 and the heating mechanism 50 in the +Z-axis direction, thereby moving the head 10 and the heating mechanism 50 away from the stage 20. By the first movement processing, a distance between an upper surface of the shaping layer formed on the stage 20 and the heater 54 is, for example, about 15 cm. Contents of the processing of steps S31 to S34 are the same as contents of the processing of steps S21 to S24 described above, respectively.

Next, the control unit 60 performs determination processing of determining whether the waiting time is elapsed since the dispensing stop processing is performed (step S36). A content of the processing of step S36 is the same as a content of the processing of step S25 described above.

When it is determined that the waiting time is elapsed since the dispensing stop processing is performed ("YES" in step S36), the control unit 60 controls the movement mechanism 30 to perform the second movement processing of moving the stage 20 and the heater 54 relative to each other to reduce the distance between the stage 20 and the heater 54 (step S37). Specifically, the control unit 60 controls the movement mechanism 30 to move the head 10 and the heating mechanism 50 in the −Z-axis direction, so as to bring the head 10 and the heating mechanism 50 close to the stage 20. By the second movement processing, the distance between the upper surface of the shaping layer formed on the stage 20 and the heater 54 is, for example, about 1 mm.

Next, the control unit 60 returns the processing to step S31.

In the three-dimensional shaping device according to the first modification of the present embodiment, the control unit 60 performs, between the dispensing stop processing and the determination processing, the first movement processing of increasing the distance between the stage 20 and the heater 54 by controlling the movement mechanism 30, and performs, between the determination processing and the second shaping layer forming processing, the second movement processing of decreasing the distance between the stage 20 and the heater 54 by controlling the movement mechanism 30.

In the three-dimensional shaping device according to the first modification of the present embodiment, since the distance between the stage 20 and the heater 54 is increased by the first movement processing, it is possible to improve a heat dissipation property of the shaping layer Ln−1 during the waiting time. When the distance between the stage and the heater is small, the heat dissipation of the shaping layer Ln−1 may be hindered by the heater in the waiting time.

In particular, when the shaping layer is laminated on the stage 20 and a total thickness of the laminated shaping layer is 2 mm or more, a temperature of an upper surface of the laminated shaping layer is more dominant in the output of the heater 54 of the heating mechanism 50 than in the output of the heater 150 provided in the barrel 140. Therefore, in particular, when the total thickness of the shaping layer laminated on the stage 20 is 2 mm or more and 7 mm or less, it is preferable to perform the first movement processing.

Although the output of the heater 54 can be stopped, the heater 54 has a large amount of stored heat, and the temperature of the heater 54 may not decrease immediately even though the output of the heater 54 is stopped. Therefore, the first movement processing as described above is effective.

Further, in the three-dimensional shaping device according to the first modification of the present embodiment, since the distance between the stage 20 and the heater 54 is reduced by the second movement processing, when the shaping layer Ln is formed, the upper surface of the shaping layer Ln−1 can be heated by the heater 54. Accordingly, an adhesion strength between the shaping layer Ln−1 and the shaping layer Ln can be increased.

2.2. Second Modification

Figure 9:
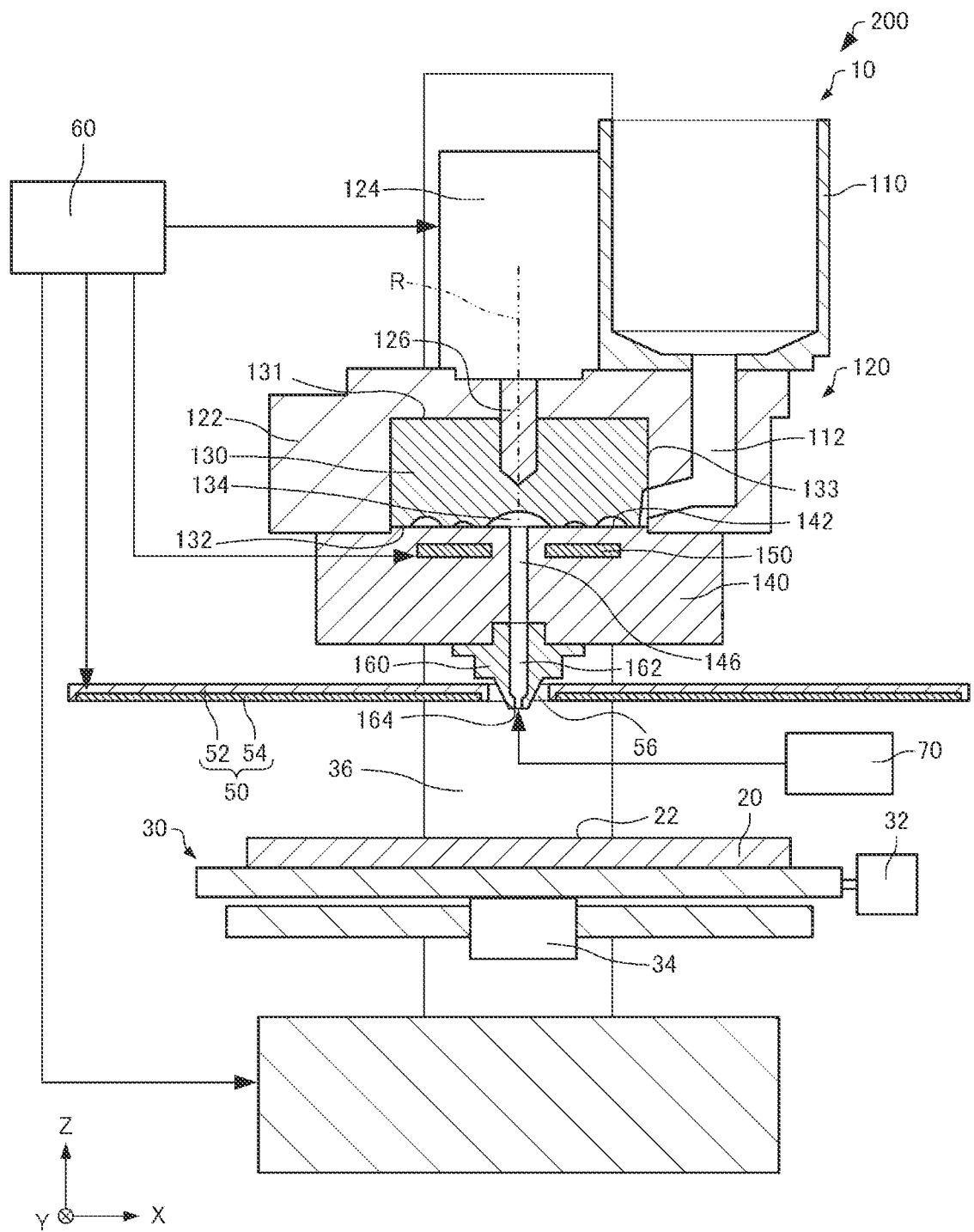
FIG. 9 is a cross-sectional view schematically showing a three-dimensional shaping device according to a second modification of the present embodiment.
Figure 10:
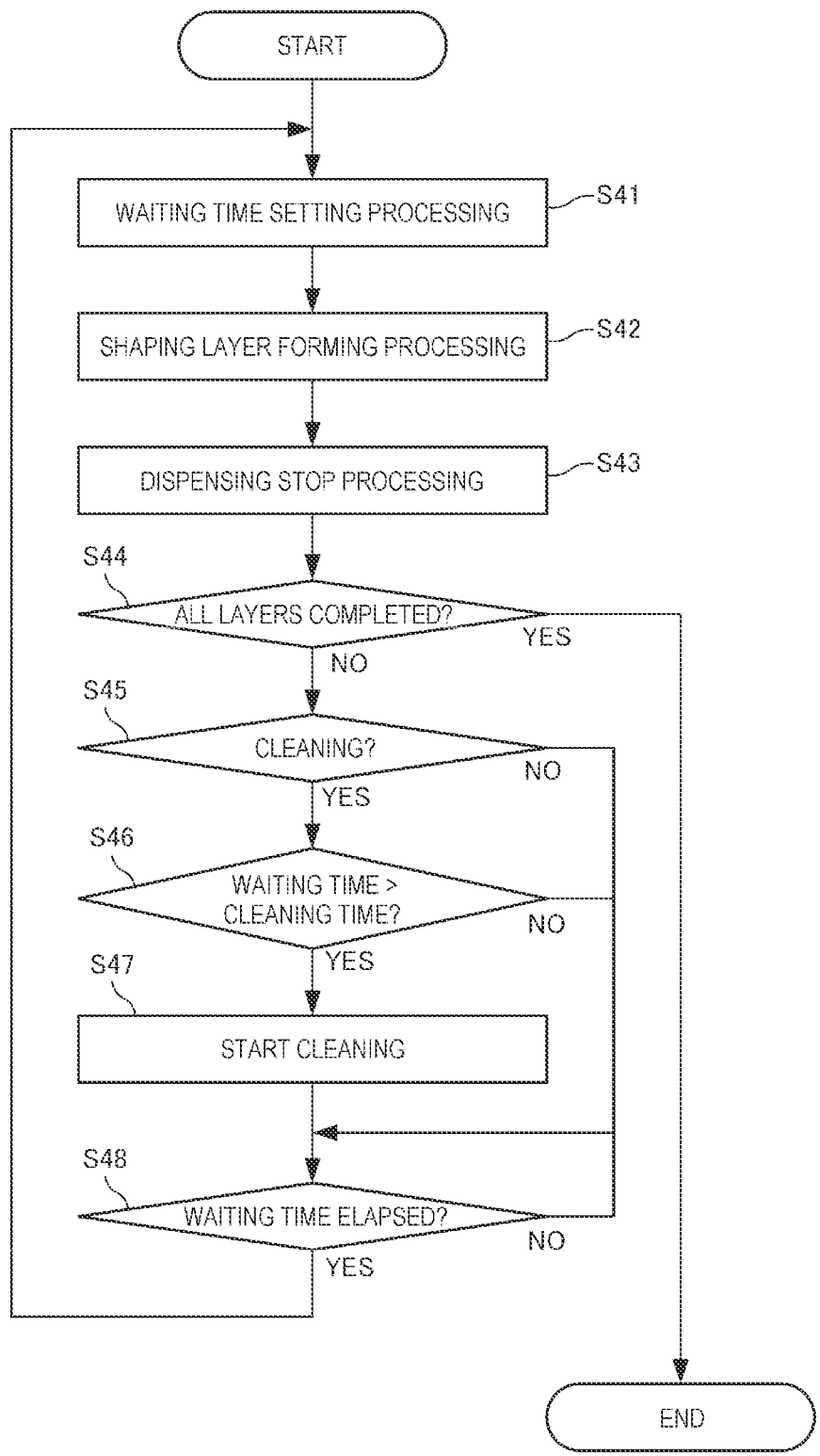
FIG. 10 is a flowchart showing processing of a control unit of the three-dimensional shaping device according to the second modification of the present embodiment.

Next, a three-dimensional shaping device according to the second modification of the present embodiment will be described with reference to the drawings. FIG. 9 is a cross-sectional view schematically showing a three-dimensional shaping device 200 according to the second modification of the present embodiment. FIG. 10 is a flowchart showing three-dimensional shaped object forming processing of the control unit 60 of the three-dimensional shaping device 200 according to the second modification of the present embodiment.

As shown in FIG. 9, the three-dimensional shaping device 200 is different from the three-dimensional shaping device 100 described above in that the three-dimensional shaping device 200 includes a cleaning mechanism 70.

The cleaning mechanism 70 cleans the head 10. Specifically, the cleaning mechanism 70 cleans the nozzle 160. Accordingly, when the nozzle opening 164 is clogged, clogging of the nozzle opening 164 can be eliminated. The form of the cleaning mechanism 70 is not particularly limited as long as the cleaning mechanism 70 can clean the nozzle 160.

As shown in FIG. 10, after performing waiting time setting processing (step S41), shaping layer forming processing (step S42), dispensing stop processing (step S43), and determination processing (step S44), the control unit 60 performs determination processing of determining whether to clean the head 10 based on the shaping data (step S45). Contents of the processing of steps S41 to S44 are the same as the contents of the processing of steps S21 to S24 described above, respectively.

When it is determined to clean the head 10 ("YES" in step S45), the control unit 60 performs determination processing of determining whether a waiting time set in step S41 is longer than a cleaning time of the head 10 by the cleaning mechanism 70 (step S46).

When it is determined that the waiting time is longer than the cleaning time, the control unit 60 controls the cleaning mechanism 70 to perform processing of starting the cleaning of the head 10 (step S47). By the processing, the control unit 60 can cause the cleaning mechanism 70 to clean the head 10 during a period from when the dispensing stop processing is performed until the waiting time is elapsed.

Next, the control unit 60 performs determination processing of determining whether the predetermined time is elapsed since the dispensing stop processing is performed (step S48). A content of the processing of step S48 is the same as a content of the processing of step S25 described above.

When it is determined to not clean the head 10 ("NO" in step S45), the control unit 60 performs processing of step S48 without performing the processing of steps S46 and S47.

When it is determined that the waiting time is not longer than the cleaning time ("NO" in step S46), the control unit 60 performs the processing of step S48 without performing the processing of step S47.

In the three-dimensional shaping device 200, when the waiting time is longer than the cleaning time of the head 10 by the cleaning mechanism 70, the control unit 60 controls the cleaning mechanism 70 to clean the head 10 during a period from when the dispensing stop processing is performed until the waiting time is elapsed. Therefore, in the three-dimensional shaping device 200, the shaping time of the three-dimensional shaped object can be shortened as compared with a case when a cleaning time is separately provided instead of performing cleaning during the waiting time.

2.3. Third Modification

Next, a three-dimensional shaping device according to the third modification of the present embodiment will be described.

In the three-dimensional shaping device 100 described above, the material supplied from the material supply unit 110 is an ABS resin.

In this regard, in the three-dimensional shaping device according to the third modification of the present embodiment, the material supplied from the material supply unit 110 is a material other than the ABS resin or a material acquired by adding another component to the ABS resin.

Examples of the material supplied from the material supply unit 110 include materials having various materials such as a thermoplastic material, a metal material, and a ceramic material as main materials. Here, the "main material" means a material serving as a center forming the shape of the shaped object, and means a material having a content of 50% by mass or more in the shaped object. The materials described above include those acquired by melting these main materials alone, and those acquired by melting a part of components contained together with the main materials into a paste form.

As the thermoplastic material, for example, a thermoplastic resin can be used. Examples of the thermoplastic resin include general-purpose engineering plastics and super engineering plastics.

Examples of the general-purpose engineering plastic include polypropylene (PP), polyethylene (PE), polyacetal (POM), polyvinyl chloride (PVC), polyamide (PA), polylactic acid (PLA), polyphenylene sulfide (PPS), polycarbonate (PC), modified polyphenylene ether, polybutylene terephthalate, and polyethylene terephthalate.

Examples of the super engineering plastic include polysulfone (PSU), polyethersulfone (PES), polyphenylene sulfide (PPS), polyarylate (PAR), polyimide (PI), polyamideimide (PAI), polyetherimide (PEI), and polyether ether ketone (PEEK).

In addition to a pigment, a metal and a ceramic, additives such as a wax, a flame retardant, an antioxidant, or a heat stabilizer may be mixed into the thermoplastic material. In the plasticizing unit 120, the thermoplastic material is plasticized and converted into a molten state by rotation of the flat screw 130 and heating of the heater 150. In addition, the shaping material generated in this manner is ejected from the nozzle 160 and then cured by a decrease in temperature. It is desirable that the thermoplastic material is heated to a temperature equal to or higher than the glass transition point thereof and ejected from the nozzle 160 in a state of being completely melted.

In the plasticizing unit 120, for example, a metal material may be used as the main material instead of the thermoplastic material described above. In this case, it is desirable that a component to be melted during generation of the shaping material is mixed into a powder material acquired by converting the metal material into a powder, and then the mixture is fed into the plasticizing unit 120.

Examples of the metal material include a single metal such as magnesium (Mg), iron (Fe), cobalt (Co), chromium (Cr), aluminum (Al), titanium (Ti), copper (Cu), and nickel (Ni), or an alloy containing one or more of these metals, maraging steel, stainless steel, cobalt chromium molybdenum, a titanium alloy, a nickel alloy, an aluminum alloy, a cobalt alloy, and a cobalt chromium alloy.

In the plasticizing unit 120, a ceramic material can be used as the main material instead of the metal material described above. Examples of the ceramic material include an oxide ceramic such as silicon dioxide, titanium dioxide, aluminum oxide, and zirconium oxide, and a non-oxide ceramic such as aluminum nitride.

A powder material of the metal material or the ceramic material supplied from the material supply unit 110 may be a mixed material in which a plurality of types of powder of a single metal or powder of an alloy and powder of a ceramic material are mixed. In addition, the powder material of the metal material or the ceramic material may be coated with, for example, the above-described thermoplastic resin or another thermoplastic resin. In this case, in the plasticizing unit 120, the thermoplastic resin may be melted to exhibit fluidity.

For example, a solvent can be added to the powder material of the metal material or the ceramic material supplied from the material supply unit 110. Examples of the solvent include: water; (poly)alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; tetraalkylammonium acetate (for example, tetrabutylammonium acetate); and ionic liquids such as butyl carbitol acetate.

In addition, for example, a binder may be added to the powder material of the metal material or the ceramic material supplied from the material supply unit 110. Examples of the binder include an acrylic resin, an epoxy resin, a silicone resin, a cellulose-based resin, other synthetic resins, PLA, PA, PPS, PEEK, and other thermoplastic resins.

The embodiments and the modifications described above are merely examples, and the present disclosure is not limited thereto. For example, the embodiments and the modifications can be combined as appropriate.

The present disclosure includes a configuration substantially the same as the configuration described in the embodiment, for example, a configuration having the same function, method, and result, or a configuration having the same purpose and effect. In addition, the present disclosure includes a configuration acquired by replacing a non-essential portion of the configuration described in the embodiment. In addition, the present disclosure includes a configuration having the same function and effect as the configuration described in the embodiment, or a configuration capable of achieving the same purpose. In addition, the present disclosure includes a configuration in which a known technique is added to the configuration described in the embodiment.

The following contents are derived from the above embodiments and modifications.

One aspect of a three-dimensional shaping device includes:

a stage;

a heater covering a shaping region of the stage and facing the stage;

a head configured to dispense a shaping material toward the shaping region;

a movement mechanism configured to move the stage and the head relative to each other; and a control unit configured to control the head and the movement mechanism, in which the control unit is configured to perform first shaping layer forming processing of forming a first shaping layer by controlling the head and the movement mechanism to dispense the shaping material from the head, dispensing stop processing of stopping dispensing of the shaping material from the head by controlling the head, determination processing of determining whether a predetermined time is elapsed since the dispensing stop processing is performed, and second shaping layer forming processing of forming a second shaping layer on the first shaping layer by controlling the head and the movement mechanism to dispense the shaping material from the head when it is determined in the determination processing that the predetermined time is elapsed, and the control unit is configured to set the predetermined time based on information related to a shaping time of the first shaping layer.

According to the three-dimensional shaping device, it is possible to reduce the possibility that the shape of the first shaping layer collapses when the second shaping layer is formed.

In one aspect of the three-dimensional shaping device, the movement mechanism may be configured to move the stage and the heater relative to each other, the control unit may perform between the dispensing stop processing and the determination processing, first movement processing of increasing a distance between the stage and the heater by controlling the movement mechanism, and between the determination processing and the second shaping layer forming processing, second movement processing of reducing a distance between the stage and the heater by controlling the movement mechanism.

According to the three-dimensional shaping device, it is possible to increase an adhesion strength between the first shaping layer and the second shaping layer while increasing a heat dissipation property of the first shaping layer during the waiting time.

One aspect of the three-dimensional shaping device may further include:

a cleaning mechanism configured to clean the head, and when the predetermined time is longer than a cleaning time of the head by the cleaning mechanism, the control unit may control the cleaning mechanism to clean the head during a period from when the dispensing stop processing is performed until the predetermined time is elapsed.

According to the three-dimensional shaping device, it is possible to shorten the shaping time of the three-dimensional shaped object.

What is claimed is:

1. A three-dimensional shaping device comprising:

a stage;

a heater covering a shaping region of the stage and facing the stage;

a head configured to dispense a shaping material toward the shaping region;

a movement mechanism configured to move the stage and the head relative to each other; and a control unit configured to control the head and the movement mechanism, wherein the control unit is configured to perform first shaping layer forming processing of forming a first shaping layer by controlling the head and the movement mechanism to dispense the shaping material from the head, dispensing stop processing of stopping dispensing of the shaping material from the head by controlling the head, determination processing of determining whether a predetermined time is elapsed since the dispensing stop processing is performed, and second shaping layer forming processing of forming a second shaping layer on the first shaping layer by controlling the head and the movement mechanism to dispense the shaping material from the head when it is determined in the determination processing that the predetermined time is elapsed, the control unit is configured to set the predetermined time based on information related to a shaping time of the first shaping layer and an area of the first shaping layer, and a period of time of the predetermined time is inversely porportional to a period of time of the shaping time of the first shaping layer.

2. The three-dimensional shaping device according to claim 1, wherein the movement mechanism is configured to move the stage and the heater relative to each other, and the control unit is configured to perform between the dispensing stop processing and the determination processing, first movement processing of increasing a distance between the stage and the heater by controlling the movement mechanism, and between the determination processing and the second shaping layer forming processing, second movement processing of reducing a distance between the stage and the heater by controlling the movement mechanism.

3. The three-dimensional shaping device according to claim 1, further comprising:
a cleaning mechanism configured to clean the head,
wherein
when the predetermined time is longer than a cleaning time of the head by the cleaning mechanism, the control unit is configured to control the cleaning mechanism to clean the head during a period from when the dispensing stop processing is performed until the predetermined time is elapsed.

* * * * *